June 1, 1965  F. MAYER  3,187,225
CONTROL SYSTEM FOR A RELAY PROTECTING A FEED CIRCUIT
Filed June 2, 1961
3 Sheets-Sheet 3
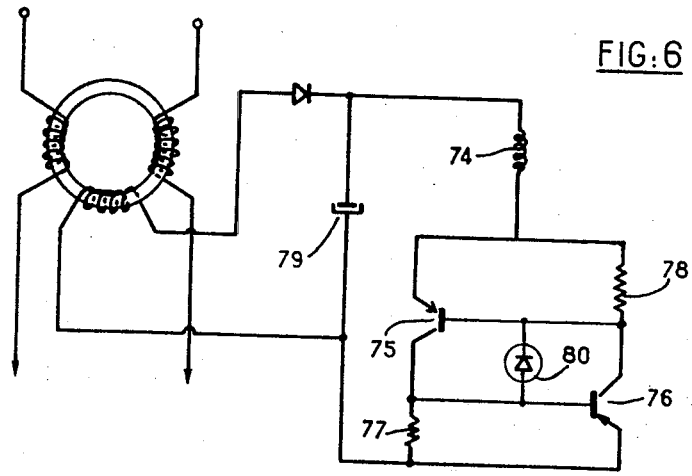
FIG: 6
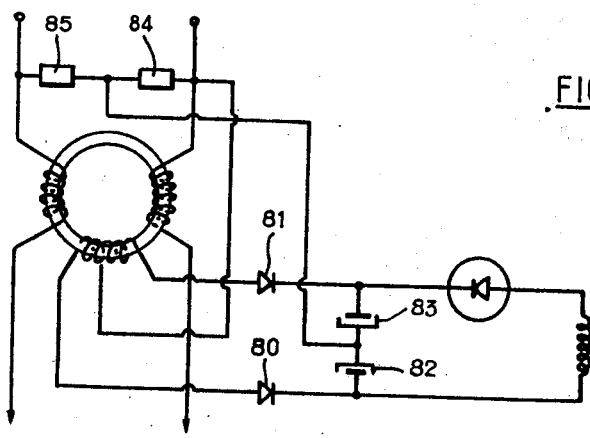
FIG: 7
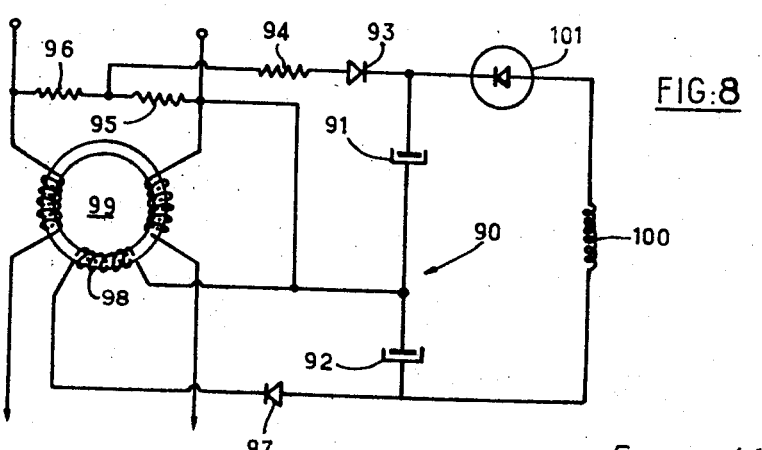
FIG: 8
INVENTOR
FERDY MAYER
By Irwin S. Thompson
ATTY.

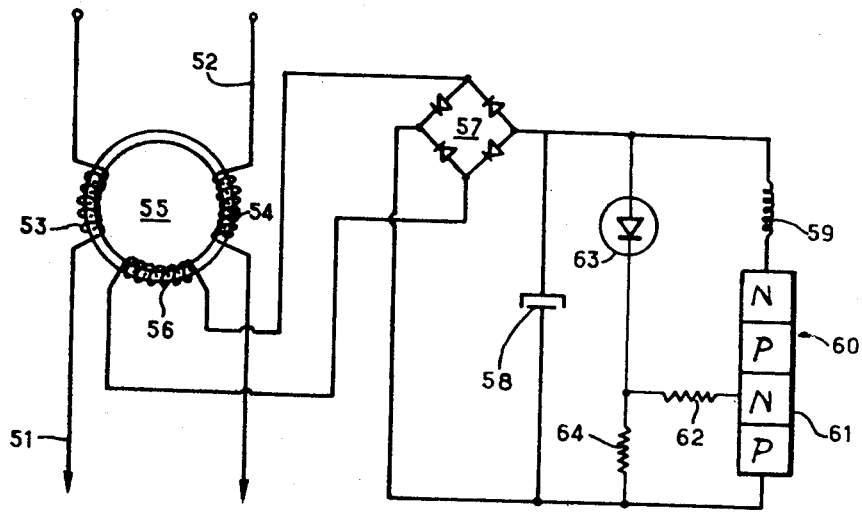
FIG: 4
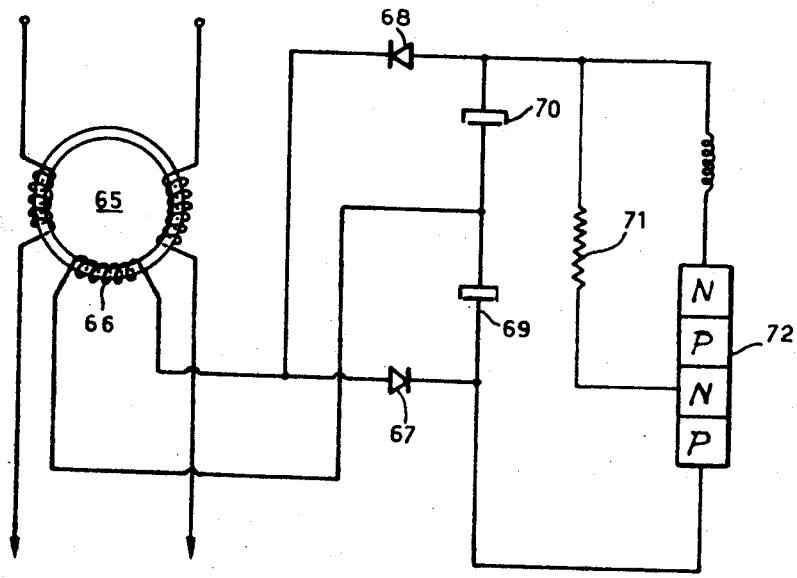
FIG: 5

United States Patent Office 3,187,225
Patented June 1, 1965

3,187,225
CONTROL SYSTEM FOR A RELAY PROTECTING A FEED CIRCUIT
Ferdy Mayer, Grenoble, Isere, France, assignor to Laboratoire d'Electronique & d'Automatique Dauphinois L.E.A.D. and Appareillage Thermoflex, Etablissements J. M. Dard, both of Isere, France
Filed June 2, 1961, Ser. No. 126,384
Claims priority, application France, June 9, 1960, 829,463, Patent 1,267,270
7 Claims. (Cl. 317—26)

My invention has for its object a control system for a relay protecting an electric feed circuit, which system is adapted to become operative when the load on the leads of said feed circuit are no longer balanced.

Arrangements of this type include generally a differential transformer provided with two primary windings, each of which is fed by the current of one of the leads in the feed circuit and a secondary winding, the voltage induced in which increases with the lack of equilibrium and is applied directly, possibly after rectification, to the winding energizing the protecting relay, with a view to producing the operation of the latter as soon as the voltage corresponding to the lack of equilibrium reaches its upper limit, which is not to be overstepped.

Said manner of controlling the protecting relay shows the drawback consisting in that the voltage signal corresponding to the lack of equilibrium carries only a very low power and should however be capable of ensuring alone and at every moment, as soon as it reaches a certain predetermined level, the operation of the protecting relay. It has therefore been necessary to provide extremely sensitive relays, for instance relays which are biased by a direct current and are associated with rectifying diodes having a very low resistance for D.C.

The present invention has for its object to remove said drawback and provides a relay control system adapted to be associated with any type of relay, while it is however of a high sensitivity.

The improved arrangement according to the invention is remarkable chiefly through the fact that the relay-energizing winding for the protecting relay is connected across the terminals of means storing electric energy adapted to be loaded by the feed circuit through the agency of an electronic switch controlled by a signal corresponding to a lack of equilibrium and produced by a difference between the currents flowing in the leads of the feed circuit.

The separation between the relay-driving means, that is of the means storing electric energy and the actual control system provided for said driving means, allows, starting from a very weak control signal, to actuate any relay through the agency of this auxiliary supply of energy, which may be constituted by a storage battery of a low capacity, or else, by a capacitor of a high capacity.

The features and advantages of the present invention will appear clearly from the following description, given by way of example, of a number of embodiments, reference being had to the accompanying drawings, wherein:

FIG. 4 is a diagrammatic view of a further embodiment.

FIGS. 5 to 8 illustrate four still further embodiments of the improved arrangement.

Figure 1:
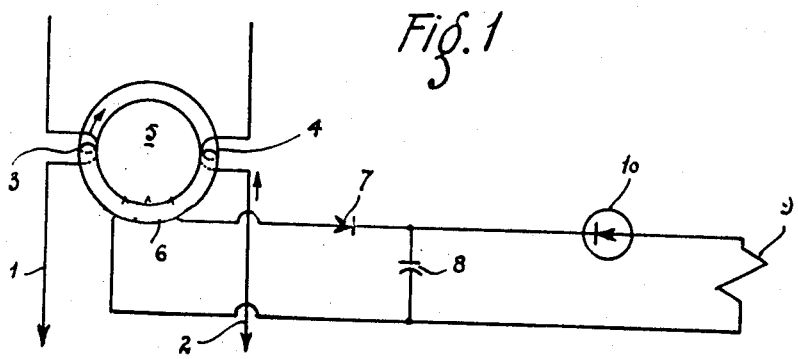
FIG. 1 is a wiring diagram of a system controlling a protecting relay and executed in accordance with the invention.
Figure 2:
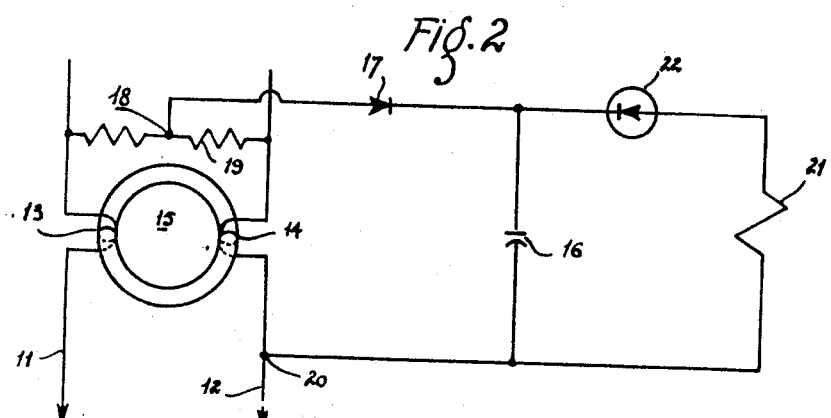
FIGS. 2 and 3 are wiring diagrams of two further embodiments of such an arrangement.

Turning to FIG. 1, 1 and 2 designate two leads serving to connect to an A.C. network a given load (not shown) which is supposed to be normally insulated from the ground. Each of said leads 1, 2 is connected in series with a winding 3, 4 respectively, of a differential transformer 5. Said transformer 5 includes a winding 6 adapted to detect a differential flux and connected through the agency of a diode 7 across the terminals of electric storage means such as a storage battery of a very low capacity, or else, of a capacitor of a high capacity, of the magnitude of 1 to 100 microfarads, the leak current in which is very low.

Across the terminals of the storage battery 8 is inserted a relay-energizing winding 9 in series with a diode 10 of a special type, which is normally locked when the voltage across its terminals is lower than a predetermined threshold, while it is released when said voltage rises above said threshold. Such diodes are at present well known under the name of "Shockley diodes" or "voltage sensitive avalanche diodes."

During operation under the action of a lack of equilibrium between the currents feeding the windings 3 and 4 of the transformer 5, there is induced in the winding 6 a voltage which ensures the gradual charging of the storage battery or capacity 8. Gradually, as said storage battery 8 is being reloaded, the speed of charging being proportional to the current provided by the lack of equilibrium, the voltage across its terminals increases. As soon as it has reached a certain threshold value, for instance 5 D.-C. volts, the diode 10 is rendered conductive and the storing means 8 are suddenly discharged and feed the winding 9, which leads to the operation of the latter and to the release of the conventional safety means.

In FIG. 2, a one-phase feed circuit includes two leads 11 and 12 in series with the corresponding windings 13, 14 of a differential transformer 15. Energy-storing means 16 are fed through the agency of a diode 17 connected, on the one hand, with a tapping 18 on a voltage divider of the resistance type 19 connected between the leads 11 and 12 and, on the other hand, with a point 20 of the lead 12, so that the possible voltage across the terminals of the winding 14 is added to that supplied by the resistance 19.

Across the terminals of the storing means 16, there is connected, as in the preceding case, the winding 21 controlling a relay and inserted in series with a locking diode 22.

During operation and when the loads on the leads 11 and 12 are balanced, the storing means 16 are loaded by the A.C. voltage between the points 18 and 20; the current being rectified by the diode 17, the rectified voltage is however not sufficient and cannot make the diode 22 operative. As soon as a lack of equilibrium appears between the loads on the leads 11 and 12, the voltage induced in the winding 14 is added to that obtained by the resistance 19 and produces a release of the diode 22. The energy-storing means 16 suddenly discharge into the winding 21 of the relay and release thus the operation of the safety means.

Figure 3:
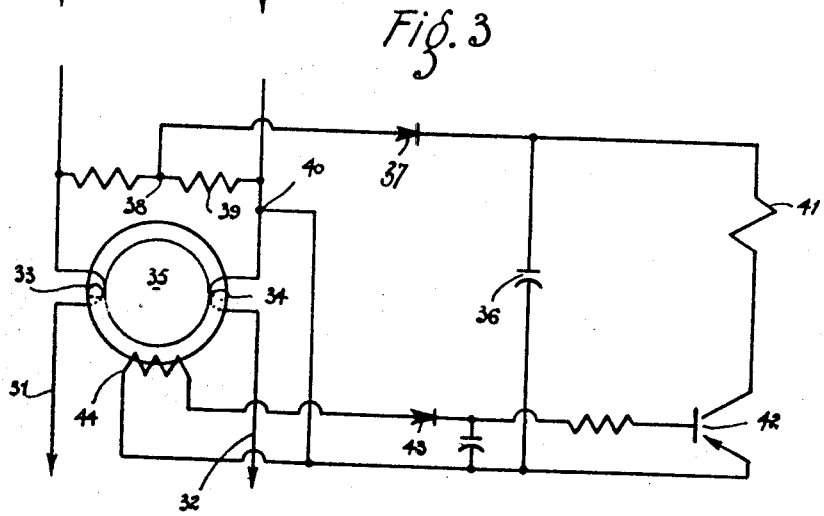

In FIG. 3, the detecting means include, in series with each of the leads 31 and 32, one of the windings 33 and 34 of a differential transformer 35. The energy-storing means 36 is fed through the agency of a diode 37 by the voltage tapped across the portion 38–40 of a resistance inserted between the leads 31, 32.

Across the terminals of the storing means 36, there is connected a relay-controlling winding 41 in series with a transistor 42, of which the base is biased by the voltage tapped across the terminals of a winding 44 of the differential transformer 35 and rectified by the diode 43.

The operation of said system is as follows: in the case of a lack of equilibrium in the current flowing through the leads 31, 32, the storing means 36 is charged by the voltage across the points 38 and 40 of the resistance 39 and the biasing of the transistor 42 is such that the latter is locked. When a lack of equilibrium between the loads in the leads arises, the voltage induced in the winding 44, which ensures, after rectification, the biasing of the transistor 42, renders the latter conductive and the storing means 36 discharge into the winding 41 of the relay. It will be remarked that the sensitivity of the latter arrangement is high by reason of the preliminary biasing of the transistor and of the amplifying action of the latter.

Turning now to FIG. 4, the system is applied to a one-phase feed circuit 51–52 and includes in each lead of said circuit one of the windings 53 and 54 of the differential transformer 55 provided with a tore-shaped core. Said transformer 55 carries also a secondary winding 56 across the terminals of which a rectifying bridge 57 is connected so as to feed means storing electric energy 58 such as a storage battery of a very low capacity or a capacitor of a high capacity, say 1 to 1000 microfarads, provided with a low leak current.

Across the terminals of the means storing electric energy 58, there is connected in series with the winding 59 controlling the protecting relay and of which the resistance has been selected with a value equal to 17 ohms in one embodiment, a diode 60 of the NPNP junction type. The base 61 of said diode is biased by a Zener diode 63 connected across the terminals of the storing means in series with a resistance 64, the value of which ranges advantageously between 10,000 and 70,000 ohms, the biasing voltage being applied to the base of the diode through the resistance 62 connected with the terminal of the diode 63 connected with the resistance 62 of a value ranging approximately between 1,000 and 10,000 ohms.

During the time during which the currents in the phases 51 and 52 are in equilibrium, the storing means 58 remain without any charge and the diode 60 is locked against operation.

Whenever a lack of equilibrium appears between the currents in the phases 51 and 52, a differential voltage appears in the winding 56; said voltage produces, after rectification at 57, a current charging the storing means 58, the voltage across the terminals of which increases gradually during said charging.

As soon as the voltage across the terminals of the storing means 58 reaches the threshold of conductivity of the Zener diode 63, the latter biases the junction diode 60 so as to make it conductive. The winding 59 is then fed through the storing means 58 which are discharged suddenly with an intensity which is sufficient to provide the energization of the protecting relay.

In the modification illustrated in FIG. 5, one of the windings 66 of a differential transformer 65 is connected through the rectifiers 67 and 68 with the terminals of the two energy-storing means 69 and 70, which are connected as a voltage-doubling system. In this case, a resistance 71 of, say 33,000 ohms, is resorted to for biasing the junction diode 72, which leads, by reason of the stable relationship provided by the diode 72 between the collector current and the collector voltage, to a well-defined threshold voltage.

According to the modification illustrated in FIG. 6, there is provided in series with the winding 74 of the protecting relay, a bistable circuit including, as well known per se, a parallel arrangement of two transistors 75 and 76 of opposed polarities and inserted in series each with the resistance 77 or 78 connected each with the collector of the corresponding transistor. The arrangement is such that the base of each transistor 75 or 76 is connected with the collector of the other transistor, while the emitters are connected respectively with one terminal of the winding 74 and with one terminal of the storage battery 79. A Zener diode 80 is connected between the collectors, that is between the resistances 77 and 78. When the Zener diode 80 becomes conductive by reason of the rise in voltage of the storage battery 79, as produced by a lack of equilibrium between the phases of the feed circuit to be controlled, the current flowing through the resistances 77 and 78 ensures a biasing of the transistors 75 and 76 in a manner such that the latter become conductive. The storage means 79 thus discharge suddenly into the relay-energizing winding 74.

Turning now to the modification illustrated in FIG. 7, the latter is more particularly applicable to the protection of the feed circuit of a receiving apparatus having a comparatively high capacity with reference to ground, for instance thermic machines embedded in their supports, motors or the like.

When such apparatus are first set under a high voltage, there may occur consequently under normal circumstances a differential reactive current which is comparatively high. It is therefore necessary to cut out in such cases the possibility of an untimely release of the protecting means.

In said FIG. 7, the rectifiers 80 and 81 are connected as phase rectifiers, so that only a current defining a lack of equilibrium which is in phase with the voltage of the feed circuit may load the sections 82 and 83 of the energy-storing means. Such connections are well known per se in the technique of synchronous demodulation. The connecting point between 82 and 83 is connected with the connecting point between resistors 84 and 85 which are connected between the leads.

It is also possible to execute, in contradistinction, a relay which is sensitive only to a differential capacitive current by injecting a voltage, the phase of which is at 90° with that of the voltage in the feed circuit. It is also possible to execute relays which are released as a function of the power factor. Obviously, in such a case the nature of the elements 84 and 85 will be modified correspondingly.

In the further modification illustrated in FIG. 8, the energy-storing means 90 include two sections 91 and 92 arranged in series, the section 91 being loaded through the rectifier 93 and the resistance 94 by a voltage tapped off a voltage divider constituted by the resistances 95 and 96, while the energy-storing element 92 is loaded through the rectifier 97 by the secondary winding 98 of the differential transformer 99.

Across the terminals of the storing means 90 is connected the winding 100 energizing the protecting relay and inserted in series with a junction diode 101 of the NPNP type.

The maximum voltage across the terminals of the storing means 91 is not sufficient for the release of the diode 101. The same is the case for the voltage across the terminals of the storing means 92. In contradistinction, the sum of said two voltages may rise above the threshold of conductivity of the diode 101.

The resistance 94 and the capacity of the storing means 91 are selected in a manner such that the loading circuit of said storing means 91 has a time constant such that its action on the protecting means may be delayed at the moment of its first energization. As a matter of fact, even of the storing means 92 loaded by the current produced by the lack of equilibrium is practically loaded within a short time by the high differential current arising during said first energization, the diode 101 becomes conductive only when the load on the storing means 91 has reached a predetermined level which depends also on the speed of loading of the storing means 92. If the differential current is then no longer persent, no release is obtained. On the contrary, if, during normal subsequent operation a differential current appears, the release is immediately performed, since the storing means 91 is actually loaded.

My invention is by no means limited to the sole embodiments disclosed and illustrated and it is obviously possible to design protecting arrangements which are sensitive to parameters other than those corresponding to the nature of the current and to time, such as, for instance, temperature, hydrometric conditions or the like, without widening the scope of the invention as defined in the accompanying claims.

It is also possible to provide the differential transformer with primary windings having different numbers of con-

What I claim is:

1. A safety system for an A.C. feed circuit the leads of which are liable to be subjected to unequal loads, comprising:
   at least one transformer including two primary windings fed by corresponding leads of the feed circuit and adapted to deliver a first A.C. control voltage rising with the difference between the currents in said primary windings as a consequence of unequal loads in the feed circuit leads;
   a voltage dividing means adapted to tap off from said feed circuit a second A.C. control voltage proportional to the actual value of the voltage across said leads;
   a D.C. electric energy storing means;
   a rectifying circuit energized by superposed action of both said first and second A.C. control voltages and feeding said storing means;
   a relay including an energizing winding connected across said storing means; and
   an electronic switch inserted between the energizing winding and the said storing means and adapted to discharge said storing means when the energy stored therein exceeds a predetermined threshold level.

2. A safety system according to claim 1 wherein said storing means comprise in series a first and a second storing element which are respectively energized through corresponding rectifier elements by said first and second A.C. control voltages.

3. A safety system for an A.C. feed circuit the leads of which are liable to be subjected to unequal loads, comprising at least one transformer including two primary windings fed by corresponding leads of the feed circuit and adapted to deliver a first A.C. control voltage rising with the difference between the currents in said primary windings as a consequence of unequal loads in the feed circuit leads; a voltage dividing means adapted to tap off from said feed circuit a second A.C. control voltage proportional to the actual value of the voltage across said leads; a D.C. electric energy storing means; a rectifying circuit energized by superposed action of both said first and second A.C. control voltages and feeding said storing means; a relay including an energizing winding connected across said storing means; and an electronic switch inserted between the energizing winding and the said storing means and adapted to discharge said storing means when the energy stored therein exceeds a predetermined threshold level; said storing means comprising in series a first and a second storing element, said rectifying circuit being adapted to apply to said first and second storing elements, through corresponding rectifier elements, said first and second A.C. control voltages, and comprising at least one resistor means connected in series with said second storing element, whereby the operation of this second storing element is delayed in time with respect to the operation of said first storing element.

4. A safety system for an A.C. feed circuit the leads of which are liable to be subjected to unequal loads, comprising: at least one transformer including two primary windings fed by corresponding leads of the feed circuit and adapted to deliver a first A.C. control voltage rising with the difference between the currents in said primary windings as a consequence of unequal loads in the feed circuit leads; a voltage dividing means adapted to tap off from said feed circuit a second A.C. control voltage proportional to the actual value of the voltage across said leads; a D.C. electric energy storing means; a rectifying circuit energized by superposed action of both said first and second A.C. control voltages and feeding said storing means; a relay including an energizing winding connected across said storing means; and an electronic switch inserted between the energizing winding and the said storing means and adapted to discharge said storing means when the energy stored therein exceeds a predetermined threshold level; said transformer also comprising a secondary winding adapted to provide the output of said first A.C. control voltage, the storing means comprising a first and a second condenser in series, said first condenser being connected through a corresponding rectifier element across said secondary winding and said second condenser being connected through a corresponding rectifier element and a resistor across said voltage dividing means.

5. A safety system according to claim 1 wherein said electronic switch comprises a diode of the voltage sensitive avalanche type.

6. A safety system for an A.C. feed circuit the leads of which are liable to be subjected to unequal loads, comprising: at least one transformer including two primary windings fed by corresponding leads of the feed circuit and adapted to deliver a first A.C. control voltage rising with the difference between the currents in said primary windings as a consequence of unequal loads in the feed circuit leads; a voltage dividing means adapted to tap off from said feed circuit a second A.C. control voltage proportional to the actual value of the voltage across said leads; a D.C. electric energy storing means; a rectifying circuit energized by superposed action of both said first and second A.C. control voltages and feeding said storing means; a relay including an energizing winding connected across said storing means; and an electronic switch inserted between the energizing winding and the said storing means and adapted to discharge said storing means when the energy stored therein exceeds a predetermined threshold level; said transformer also comprising a secondary winding with two terminals forming the output of said first A.C. control voltage and a mid-point terminal, said storing means comprising two storing elements in series at each side of a mid-point terminal, said second A.C. voltage being applied across both said mid-point terminals.

7. A safety system for an A.C. feed circuit the leads of which are liable to be subjected to unequal loads, comprising: at least one transformer including two primary windings fed by corresponding leads of the feed circuit and adapted to deliver a first A.C. control voltage rising with the difference between the currents in said primary windings as a consequence of unequal loads in the feed circuit leads; a voltage dividing means adapted to tap off from said feed circuit a second A.C. control voltage proportional to the actual value of the voltage across said leads; a D.C. electric energy storing means; a rectifying circuit energized by superposed action of both said first and second A.C. control voltages and feeding said storing means; a relay including an energizing winding connected across said storing means; and an electronic switch inserted between the energizing winding and the said storing means and adapted to discharge said storing means when the energy stored therein exceeds a predetermined threshold level; each of said primary windings having a first and a second terminal, said voltage dividing means comprising a chain of resistors connected in series between said first terminals of said primary windings, with an intermediary terminal provided on said chain, and said storing means being connected through said rectifying circuit between said intermediary terminal of said chain and said second terminal of one of said primary windings.

References Cited by the Examiner

UNITED STATES PATENTS

| | | | |
|---|---|---|---|
| 1,504,691 | 8/24 | Hochstadter | 317—26 |
| 2,897,413 | 7/59 | Hodges | 317—148.5 |

(Other references on following page)

UNITED STATES PATENTS

| | | | |
|---|---|---|---|
| 2,915,710 | 12/59 | Schiewe et al. | 317—148.5 |
| 2,942,123 | 6/60 | Schuh | 317—148.5 |
| 2,947,916 | 8/60 | Beck | 317—148.5 |
| 2,987,653 | 6/61 | Prapis | 317—148.5 |
| 3,001,100 | 9/61 | Schuh et al. | 317—33 |
| 3,018,356 | 1/62 | Busch et al. | 317—33 X |

FOREIGN PATENTS

| | | |
|---|---|---|
| 461,495 | 6/28 | Germany. |
| 845,308 | 8/60 | Great Britain. |
| 1,225,255 | 6/60 | France. |

OTHER REFERENCES

RCA TN No. 168, August 18, 1958, 317—148.5.

SAMUEL BERNSTEIN, *Primary Examiner.*

LLOYD McCOLLUM, *Examiner.*